E. M. KRUM.
Pawl and Ratchet.
No. 157,997. Patented Dec. 22, 1874.
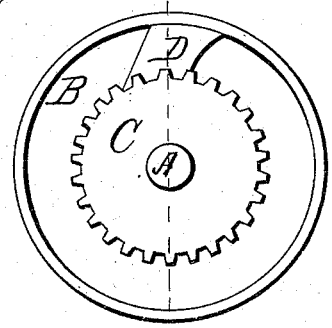
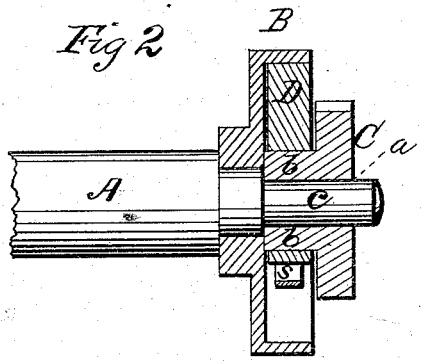 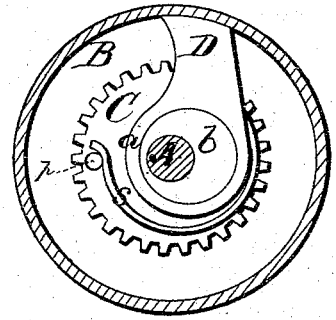
WITNESSES
Robert Everitt
F. J. Masi
INVENTOR
Edward M. Krum
Chipman Hosmer & Co,
ATTORNEYS

UNITED STATES PATENT OFFICE.

EDWARD M. KRUM, OF CHATHAM, NEW YORK.

IMPROVEMENT IN PAWLS AND RATCHETS.

Specification forming part of Letters Patent No. 157,997, dated December 22, 1874; application filed November 21, 1874.

*To all whom it may concern:*

Be it known that I, EDWARD M. KRUM, of Chatham, in the county of Columbia and State of New York, have invented a new and valuable Improvement in Pawl and Ratchet; and I do hereby declare that the following is a full, clear, and exact description of the construction and operation of the same, reference being had to the annexed drawings making a part of this specification, and to the letters and figures of reference marked thereon.

Figure 1 of the drawing is a representation of a front view of my device. Fig. 2 is a longitudinal sectional view of the same; and Fig. 3 is a sectional view, showing internal arrangement.

This invention has relation to pawls and ratchets which are especially adapted for use in connection with harvester-machines; and the nature of the invention consists in an eccentric rigidly secured to or forming a part of the cog-wheel actuating the cutter-bar mechanism, upon which is applied a pivotal dog, which eccentric will actuate the dog to bear against the inner peripheral surface of a cylindrical drum keyed upon the shaft of the harvester, thereby locking the cog-wheel to the shaft, and causing it to be actuated when the machine is moved ahead, a backward movement of the machine releasing the drum from the gripe of the dog, and allowing the transportation-wheels to rotate the shaft without actuating the cog-wheel. It also consists in combining with such a cog-wheel, having an eccentric upon its center, and a dog pivotally applied thereon, a spring, which holds the said dog at all times in contact with the inner peripheral surface of the drum, whereby the bite of the said dog upon the drum is rendered instantly effective for actuating the cutter-bar mechanism when the machine is started ahead, as will be hereinafter more fully explained.

In the annexed drawings, A designates the shaft of a harvester, in connection with which I propose to show the use and construction of my improved gripe or pawl and ratchet. B represents a drum, of cast-iron or other suitable material, which is open at one end, and is rigidly keyed upon the said shaft, as shown in Fig. 2. C is the actuating cog-wheel of the cutter-bar mechanism, having a central perforation, *a*, and an eccentric, *b*. This eccentric is preferably a component part of cog-wheel C—that is to say, is cast with it; but, if found desirable, it may be separately formed, and then rigidly secured in any suitable manner to the cog-wheel. D indicates a dog, of any suitable metal, having on one end an enlargement, through which a circular aperture, *d*, is cut, adapted to receive within it the eccentric *b*, upon which the said dog freely pivots when thus arranged. The cog-wheel, with the dog D upon its eccentric, is passed over the reduced end *c* of the shaft, and forced inward until the dog and eccentric are received within the open end of the drum B, when the free end of the dog will bear against the inner surface of its periphery.

When the harvester is started ahead, the forward rotation of the shaft will communicate a forward rotation to the drum, thereby causing the dog to be jammed, by the wedging action of the eccentric on the cog, against the inner surface of its periphery, and rigidly locking the cog to the shaft, so that the cutter-bar will be actuated; and the gripe of the dog on the drum being due to friction, which is increased as the power of the pinion is increased, slipping is rendered absolutely impossible. When the machine is backed, the dog rotates on the eccentric in an opposite direction from the shaft and drum, removing the gripe thereof upon the latter by releasing it from the wedge-like action of the eccentric; hence, the shaft may rotate in backing without actuating the cog, and the release of the drum from the gripe of the dog being instantaneous, the cessation of actuation of the pinion C is likewise instantaneous, insuring a correspondingly-rapid arrest of motion of the cutter-bar.

When the machine is again run ahead the gripe of the dog is again renewed upon the drum, and the action of the cog-wheel or pinion C upon the cutter-bar instantly commences, owing to the fact that the spring S, (shown in Fig. 3,) by taking up the slack, holds the dog D in close contact with the inner surface of the drum, thus enabling the dog to catch and drive, to all intents and purposes, immediately. This spring S is secured at one end to the dog D in any suitable manner, its other end being bent around the enlargement *a* a sufficient distance, and engaged with a pin, *p*.

In machines heretofore constructed the ordinary pawl and ratchet in common use for connecting and disconnecting the shaft and pinion allows the machine to be moved three or four inches ahead into the grass before motion is given to the knife, which extent of grass consequently fails to be cut, and in backing a great clatter is made by the pawl in passing over the teeth of the rack.

In my improved ratchet and pawl the dog catches and holds instantly, thus causing the knife to cut every blade of grass as it is moved ahead, and in backing or turning its action is noiseless.

In two-wheeled machines I propose to use one of these pawls and ratchets at each side thereof, so that, when the machine is turned in one direction, one dog will hold and drive the cutter-bar, and the other fall back, each wheel acting independently of the other, and thereby enabling the machine to turn short; but when the machine runs ahead both dogs will hold.

As was before said, my improved dog and ratchet are peculiarly adapted for use in connection with harvesters and mowers; but I do not propose to confine its application to these mechanisms. It is as well adapted for application to many other devices where the common pawl and rack are now used.

What I claim as new, and desire to secure by Letters Patent, is—

1. The combination, with the drum B, rigidly secured upon the shaft A, of the dog or pawl D, applied upon the eccentric *b* of pinion C and springs S, substantially as specified.

2. The combination, with the drum B, dog or pawl D, and pinion C, having an eccentric, *b*, of the spring S, substantially as and for the purpose specified.

In testimony that I claim the above I have hereunto subscribed my name in the presence of two witnesses.

EDWARD M. KRUM.

Witnesses:
CHAUNCEY A. KING,
JOHN B. WAIT.